US007917237B2

(12) United States Patent
Kawamura et al.

(10) Patent No.: US 7,917,237 B2
(45) Date of Patent: Mar. 29, 2011

(54) RECEIVING APPARATUS, SENDING APPARATUS AND TRANSMISSION SYSTEM

(75) Inventors: Akihisa Kawamura, Hirakata (JP); Naoki Esima, Hirakata (JP)

(73) Assignee: Panasonic Corporation, Osaka (JP)

( * ) Notice: Subject to any disclaimer, the term of this patent is extended or adjusted under 35 U.S.C. 154(b) by 1230 days.

(21) Appl. No.: 10/558,186

(22) PCT Filed: Jun. 16, 2004

(86) PCT No.: PCT/JP2004/008775

§ 371 (c)(1),
(2), (4) Date: Nov. 25, 2005

(87) PCT Pub. No.: WO2004/112021

PCT Pub. Date: Dec. 23, 2004

(65) Prior Publication Data

US 2006/0288851 A1 Dec. 28, 2006

(30) Foreign Application Priority Data

Jun. 17, 2003 (JP) ................................ 2003-171729

(51) Int. Cl.
*G06F 17/00* (2006.01)
*G10L 19/00* (2006.01)

(52) U.S. Cl. ........................................ 700/94; 704/201

(58) Field of Classification Search .................... 700/94; 704/201, 501, 500
See application file for complete search history.

(56) References Cited

U.S. PATENT DOCUMENTS

| | | | | |
|---|---|---|---|---|
| 6,205,223 | B1 | 3/2001 | Rao et al. | |
| 6,525,253 | B1 | 2/2003 | Kikuchi et al. | |
| 6,988,013 | B1 | 1/2006 | Fujishita | |
| 2001/0044712 | A1 | 11/2001 | Vainio et al. | |
| 2004/0252036 | A1* | 12/2004 | Nitzpon et al. | 341/61 |

FOREIGN PATENT DOCUMENTS

| | | |
|---|---|---|
| JP | 06-038050 | 2/1994 |
| JP | 2000-020055 | 1/2000 |
| JP | 2003-134469 | 5/2003 |
| WO | 00/30103 | 5/2000 |

OTHER PUBLICATIONS

ChristianHJW, http://club.myce.com/f32/important-project-update-matroska-chip-release-out-73425/#post449904, post #2 May 8, 2003, 4 pages.*

International Standard IEC61937-1 (First Edition 2003-05) Digital Audio—*Interface for Non-linear PCM Encoded Audio Bitstreams Applying IEC60958*—Part 1: General.

(Continued)

*Primary Examiner* — Vivian Chin
*Assistant Examiner* — Joseph Saunders, Jr.
(74) *Attorney, Agent, or Firm* — Wenderoth, Lind & Ponack, L.L.P.

(57) ABSTRACT

A sending apparatus includes a compressed music data outputting unit that outputs one of compressed music data including compressed basic music data in a first mode and compressed music data including the basic music data as well as high frequency information for extending high frequency of the basic music data in a second mode, and a formatter that transmits a compressed music data outputted by the compressed music data outputting unit first and then music information including a value indicating which mode is used for the compressed music data.

5 Claims, 15 Drawing Sheets

OTHER PUBLICATIONS

Naoya Tanaka et al., MPEG-4 *Audio Low-Complexity Bandwidth Extension Technology* (*Low-Power SBR*), May 2003.

T. Ziegler et al., "*Enhancing MP3 With SBR: Features and Capabilities of the New MP3PRO Algorithm*", Audio Engineering Society Convention Paper, New York, NY, US, vol. 112, No. 5560, May 10, 2002, pp. 1-7, XP009020935.

"*Data Sheet: UDA1352TS, 48khZ IEC 60958 audio DAC*", Philips Semiconductors, 'Online!, Nov. 22, 2002 XP002312971, Retrieved from the Internet: URL:http://www.semiconductors.philips.com/acrobat_download/datasheets/UDA1352TS_2.pd f> retrieved on Nov. 11, 2005, pp. 21-22.

"*Text OFISCO/IEC 14496-3:2001/FPDAM 1. Bandwidth Extension*", ISO/IEC JTC1/SC29/WG11 N5203, XX, XX, Oct. 2002, pp. 1-90, XP001124389.

International Standard IEC61937-6, *Digital Audio-Interface for non-linear PCM encoded audio bitstreams applying IEC60958*, Aug. 2002, pp. 1-7.

* cited by examiner

Prior Art 80
81
82
Burst-preamble
Burst-payload 81
811 812 813 814
Pa
Pb
Pc
Pd
0~4⇒7

821
822
Stream header
Basic compression stream 821
822
823
Stream header
Basic compression stream
High frequency information parameter
Prior Art

FIG. 3

| Bits of Pc | Value | Contents | Reference Point R | Repetition period of data-burst in IEC 60958 frames |
|---|---|---|---|---|
| 0−4 | 0−6 | in accordance with IEC61937 | | |
| | 7 | MPEG−2 AAC ADTS | bit 0 of Pa | 1024 |
| | 8−31 | in accordance with IEC61937 | | |
| 5−15 | | in accordance with IEC61937 | | |

Prior Art

FIG. 4

| Bits of Pc LSB..MSB | Value | Contents |
|---|---|---|
| 8−12 | 0 | No indication |
| | 1 | LC profile |
| | 2,3 | Reserved for Future profile |
| | 4−31 | Reserved |

Prior Art

Prior Art

Prior Art

FIG. 11

| Bits of Pc | Value | Contents | Reference Point R | Repetition period of data-burst measured In IEC60958 frames |
|---|---|---|---|---|
| 0−4 | 0−6 | in accordance with IEC61937 | | |
| | 7 | MPEG−2 AAC ADTS | bit 0 of Pa | 1024 |
| | 8−18 | in accordance with IEC61937 | | |
| | 19 | MPEG−2 AAC ADTS Low sampling frequency | | |
| | 20−31 | in accordance with IEC61937 | | |
| 5,6 | 0 | Sub Data type MPEG−2 AAC 1/2 Low sampling frequency | bit 0 of Pa | 2048 |
| | 1 | Sub Data type MPEG−2 AAC 1/4 Low sampling frequency | bit 0 of Pa | 4096 |
| | 2,3 | reserved | | |
| 7−15 | | in accordance with IEC61937 | | |

FIG. 12

| Bits of Pc LSB..MSB | Value | Contents |
|---|---|---|
| 8–12 | 0 | No indication |
| | 1 | LC profile |
| | 2,3 | Reserved for Future profile |
| | 4 | LC profile with SBR |
| | 5–31 | Reserved |

RECEIVING APPARATUS, SENDING APPARATUS AND TRANSMISSION SYSTEM

BACKGROUND OF THE INVENTION

1. Technical Field

The present invention relates to a receiving apparatus, a sending apparatus and a transmission system for transmitting music information and its compressed music data digitally between digital apparatuses.

2. Background Art

International standards such as IEC 60958 and IEC 61937 are methods for serial digital transmission of conventional music information or music data.

The IEC 60958 is a method used at the time when transmitting 2ch linear PCM data and widely used for digital data transmission from CDs and DVDs. Also, the IEC 61937 is a method used at the time of communicating data that is non-linear PCM like compressed music data such as MPEG and has been used recently in the case of outputting DVD compression multi channel voice, connecting to the external decoder amplifier so as to decode and play back the voice. An object of the above-mentioned conventional music information and music data transmission method is to easily transmit and play back the transmitted compressed music data.

Recently, MPEG standardizes the ISO 13818-7 MPEG2 AAC for enabling high quality playback in the case of low bit rate at the level of 128 kbps stereo as an international standard. On the other hand, in the MPEG2 AAC, in the case of lower bit rate at the level of 48 kbps stereo, human sensitivity to the sound of high frequency around 10 kHz or more becomes lower than the sensitivity to the low frequency, reduces information distribution to the high components and, as a result, becomes playback sound with a narrow band. Coding information amount of around 48 kbps stereo bit rate reduces the band that can be quantized and coded retaining sound quality to around 10 kHz at most. Here, MPEG suggests a method for enabling playback of high band by adding little information amount to a coded stream that adds playback sound with a narrow band like this. There is a method (ISO 13818-7:2003/AMD1) that is being standardized as the Spectral Band Replication (AAC SBR), the method is for retaining information of high frequency band in an area inside bit stream data even in the case of a low bit rate, reconstructing a part of high frequency band using the high frequency information at a decoding side even in the case where a basic part is compressed using a low sampling frequency so as to play back the bit stream.

FIG. 1 is a diagram showing an example of connecting apparatuses in the case of performing data transmission.

The music data transmission system 900 comprises a music data sending apparatus 910 for transmitting music data using a predetermined interface (for example, IEC 61937), a music data receiving apparatus 920 for receiving music data and a transmission path 930 for connecting these apparatuses.

FIG. 2A is a diagram showing the format structure of the data burst 80 to be transmitted from the music data sending apparatus 910.

As shown in FIG. 2A, each data burst 80 comprises a burst preamble 81 and a burst payload 82 that follows this burst preamble 81.

FIG. 2B is a diagram showing the format structure of the burst preamble 81.

The burst preamble 81 comprises a Pa811 for indicating a synchronization word field, a Pb812, a Pc813 for indicating the type of data and a field for providing information for a receiver (burst information) and a Pd814 for indicating a field for providing the length of the burst payload.

FIG. 3 is a diagram showing a structural example of burst information.

As to bit 0-4 of the Pc813, value 7 indicates "MPEG 2AAC ADTS", but value 0 to 6 and 8 to 31 indicate "in accordance with IEC 61937". Also, bit 5-15 indicates "in accordance with IEC 61937".

FIG. 4 is a diagram showing a structural example as to the bit 8-12 of the burst information.

As to bit 8-12 of the Pc813, value 0 indicates "No indication", value 1 indicates "LC profile", value 2 to 3 indicates "Reserved for Future profile", and value 4 to 31 indicates "Reserved".

In other words, conventional burst information does not distinguish MPEG 2 AAC from MPEG 2 AAC SBR.

FIG. 2C is a diagram showing the bit stream structure of the MPEG2 AAC stored in the burst payload 82.

As shown in FIG. 2C, the bit stream of the MPEG2 AAC stored in the burst payload 82 comprises a stream header 821 and a basic compression stream 822 of the compressed music data.

FIG. 2D is a diagram showing the bit stream structure of the MPEG2 AAC SBR stored in the burst payload 82.

As shown in FIG. 2D, the bit stream of the MPEG2 AAC SBR comprises a stream header 821, a basic compression stream 822 and a high frequency information parameter 823. The high frequency information parameter 823 is recorded using a part (for example, fill element) of the last part of the basic compression stream 822.

The music data receiving apparatus 920 analyzes this bit stream and reconstructs the high frequency band using the high frequency information parameter, but it can decode only the basic compression stream 822 and ignore the high frequency parameter 823 even in the case where the music data receiving apparatus 920 can perform only a normal AAC decoding processing and cannot perform an SBR processing, which enables maintaining upward compatibility with the MPEG2 AAC.

However, in the case of sending this information using the IEC 61937 standard, frequency band is restricted and this information is compressed in most cases because the part of basic compression stream 822 has a stricter limit in information amount in the case where it is compressed using a lower bit rate of 48 kbps stereo or the like than in the case where it is compressed using a higher bit rate of 128 kbps or the like. In the case where the sampling frequency of original sound is 48 kHz, it is compressed by down sampling to the half, that is, the sampling frequency of fc, and the sampling frequency fc is recorded in the stream header 821.

FIG. 5 is a structural diagram of a conventional music data receiving apparatus.

As shown in FIG. 5, the music data receiving apparatus 920 comprises a compressed music information analyzing unit 922, a bit stream analyzing unit 923, a basic signal decoding unit 924, a high frequency signal reconstructing unit 925, a band spreading unit 926, a D/A converter 927 and an output control unit 928.

The compressed music information analyzing unit 922 analyzes compressed music data inputted via the transmission path 93.

The bit stream analyzing unit 923 analyzes stream header information.

The basic signal decoding unit 924 decodes the basic part of the bit stream.

The high frequency signal reconstructing unit 925 reconstructs the high frequency signal based on the high frequency information parameter.

The band spreading unit 926 synthesizes the basic signal with the high frequency signal and converts it into time area signal.

The D/A converter 927 converts the digital signal into an analog signal.

The output control unit 928 sets a parameter such as sample frequency or a digital filter coefficient or the like at the D/A converter 927 and the like.

Next, the compressed music data playback processing performed in the music data receiving apparatus 920 will be explained.

FIG. 6 is a flow chart showing the operation of the compressed music data playback processing performed in the music data receiving apparatus 920.

The compressed music information analyzing unit 922 of the music data receiving apparatus 920 waits for receiving the compressed music data sent in a form of the IEC 61937 data format (S91). On receiving the compressed music data, the compressed music information analyzing unit 922 analyzes the information (Pc) of the burst preamble 81 and judges the type of the compressed music data (S92). Here, it is judged as the MPEG 2AAC Low sampling frequency, in other words, the case where the value of the bit 0-4 of Pc is 7 and the value of the bit 8-12 is 1 will be explained. Next, the bit stream analyzing unit 923 analyzes the information of the stream header 821 (S93). The bit stream analyzing unit 923 notifies the output control unit 928 of the sampling frequency recorded in the stream header 821. Output control unit 928 sets a master lock corresponding to the detected sampling frequency and a digital filter coefficient that are detected in the D/A converter 927 and the digital filter coefficient (S94). Next, the basic signal decoding unit 924 starts reading the basic compression stream 822 (S95). After that, the basic signal decoding unit 924 judges whether there is a high frequency parameter or not (S96). This judgment can be made after the basic signal decoding unit 924 finishes reading the last part of the basic compression stream 822 and confirms the presence of the high frequency parameter 823. More specifically, the judgment is made after identifying that a predetermined identifier showing that a high frequency information parameter is stored around the leading part of fill element is set and that it is surely the predetermined identifier by the CRC check.

In the case where there is a high frequency information parameter 823, actual playback is started from the basic signal decoding unit 924 again after setting a sampling frequency that is twice the sampling frequency recorded in the stream header 821 of the output control unit 928.

The AAC-SBR method has a data structure of the bit stream that is the same as a conventional MPEG2 AAC and has a compatibility with a conventional MPEG2 AAC, but no flag indicating that a high frequency information parameter 823 is included in the stream header 821. Also, the high frequency information parameter is recorded in the last part of the basic compression stream.

Therefore, the music data receiving apparatus 920 recognizes the presence of the high frequency compression stream 823 after analyzing the description of the music compressed data up to the last part.

In this way, a parameter for outputting sampling frequency is set in the D/A converter 927 or the like after reading the basic compression stream 822, the high frequency information parameter 823, that is, the burst stream 80 up to the last part, which causes a problem that it takes a lot of time for setting.

Therefore, the present invention aims to provide a receiving apparatus, a sending apparatus and a transmission system of compressed music data that enable instantly judging the presence or absence of high frequency information corresponding to music data to be transmitted in compressed music data transmission.

SUMMARY OF THE INVENTION

In order to achieve the above-mentioned object, the sending apparatus concerning the present invention comprises: a compressed music data outputting unit operable to output one of compressed music data including compressed basic music data in a first mode and compressed music data including the basic music data as well as high frequency information for extending high frequency of the basic music data in a second mode; and a formatter operable to transmit the compressed music data outputted by the compressed music data outputting unit and music information including a value indicating a mode which is used for the compressed music data, in the transmission order of the music information first and the compressed music data next.

In this way, in a receiving apparatus, before analyzing the compressed music data, it is possible to know the presence or absence of the high frequency information from the value that shows the mode included in the music data. In other words, it is possible to know the presence or absence of the high frequency information from the leading part of the data burst and the header without viewing to the last part of the data burst. Therefore, it is possible to instantly decide the magnification to the sampling frequency and the like and perform playback of music by decoding the compressed music data based on the presence or absence of the high frequency information without analyzing the compressed music data.

Also, in the sending apparatus concerning the present invention, the music information is represented as j ($j>2$) bits, the formatter sets a predetermined value indicating the second mode at k ($j>k>2$) bits of the j bits.

In this way, it is possible to indicate the presence of the second mode, that is, high frequency information, retaining convertibility without altering a conventional way.

Also, in the sending apparatus concerning the present invention, the formatter sets a predetermined value at m ($j>m>2$) bits of the j bits different from the k bits so as to indicate that the predetermined value set in the k bits is effective.

In this way, it is possible to indicate the second mode, that is, the presence of the high frequency information or other information only using a few bits retaining the convertibility without altering a conventional way.

Also, in the sending apparatus concerning the present invention, the formatter transmits the music information and the compressed music data using a transmission clock corresponding to a sampling frequency of the basic music data.

In this way, in the receiving apparatus, it is possible to obtain a sampling frequency without analyzing the compressed music data based on the transmission clock, and drastically reduce the time for playing back music.

Also, the receiving apparatus, concerning the present invention, for receiving the compressed music data and music information concerning the compressed music data, in the transmission order of the music information first and the compressed music data next, wherein one of the case where the compressed music data including compressed basic music data is made in a first mode and the case where the compressed music data including the basic music data as well as high frequency information for extending high frequency of the basic music data is made in a second mode, the music information includes a value indicating a mode which is used for the compressed music data, and the receiving apparatus comprises a compressed music data analyzing unit operable to analyze a value indicating a mode which is used for the compressed music data.

In this way, it is possible to know the presence or absence of the high frequency information from the value indicating the mode included in the music information before receiving the music data. Therefore, it is possible to instantly decide a magnification to the sampling frequency and the like based on the presence or the absence of the high frequency information before analyzing the compressed music data and instantly perform playback of music as soon as the compressed music data is decoded.

Also, in the receiving apparatus concerning the present invention, the compressed music data analyzing unit receives the music information and the compressed music data using a transmission clock corresponding to a sampling frequency of the basic music data and obtains a sampling frequency based on the received transmission clock, the receiving apparatus further comprises: a D/A converter for converting a signal from digital to analog based on the compressed music data; and an output control unit operable to previously set a sampling frequency of a predetermined magnification in the D/A converter based on the sampling frequency notified by the compressed music data analyzing unit and the mode of the compressed music data.

In this way, it is possible to arrange the preparation for playback of music before analyzing the music data.

Also, the receiving apparatus concerning the present invention, further comprises: a basic signal decoding unit operable to decode the basic music data; a high frequency signal reconstructing unit operable to reconstruct the high frequency signal based on the high frequency information in the case of the second mode; and a band spreading unit operable to output a signal decoded by the basic signal decoding unit in the case of the first mode and output the signal by synthesizing the signal decoded by the basic signal decoding unit with the signal reconstructed by the high frequency signal reconstructing unit in the case of the second mode, wherein the D/A converter converts the signal from digital to analog, the signal being outputted by the band spreading unit using a previously set sampling frequency.

In this way, in the case of the first mode, it is possible to perform playback of music in a band corresponding to the basic music data and perform high quality playback of music for which band spreading is performed in the case of the second mode.

Also, the receiving apparatus concerning the present invention, further comprises a high frequency signal generating unit operable to generate a high frequency signal based on the basic music data, wherein the output control unit controls the band spreading unit in a way that the output control unit synthesizes a signal decoded by the basic signal decoding unit in the case of the first mode with a high frequency signal generated by the high frequency signal generating unit, outputs the synthesized signal and also controls the operation of the D/A converter.

In this way, in the case of the first mode, it is possible to perform high quality playback of music for which band spreading is performed like the case of using the second mode.

The present invention is not only realized as a sending apparatus or a receiving apparatus like this but also structured as a transmission system that connected a sending apparatus with a receiving apparatus like this via a transmission path, realized as a receiving method, sending method and transmission method where characteristic units equipped by a sending apparatus or a receiving apparatus as steps and realized as a program for causing a computer to execute these steps. After that, it is needless to say that the program like this can be distributed via a recording medium such as a CD-ROM or a transmission medium of the Internet and the like.

Japanese Patent application No. 2003-171729 filed on Jun. 17, 2003, is incorporated herein by reference.

In this way, with the present invention, in the case where compressed music data is transmitted using the IEC 61937, as the compressed music data outputted by the compressed music data outputting unit and the music information including the value indicating the mode of the compressed music data are transmitted, in the transmission order of the music information first and the compressed music data next, using a transmission clock corresponding to a sampling frequency of the compressed basic music data, a sampling frequency of the basic music data is obtained from the analysis of a transmission clock, and analyzing the value indicating the mode of the compressed music data indicates the presence or absence of the high frequency information.

Therefore, the present invention eliminates the necessity of reading and analyzing all the compressed music data to the last like the conventional way, a sampling frequency, which enables instantly deciding a magnification to this sampling frequency and the like and instantly playing back music, and thus the present invention is highly practical today when a system for playing back music by data transmission.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing the structural example of the burst information.

FIG. 4 is a diagram showing the structural example as to bit 8-12 of the burst information.

FIG. 11 is a diagram showing a setting example which is performed on the Pc (bit 0-15) of the burst preamble 41 of the MPEG2 AAC Low sampling frequency.

FIG. 12 is a diagram showing the structural example of the burst preamble Pc (bit 8-12) of the MPEG2 AAC Low sampling frequency.

DETAILED DESCRIPTION OF THE INVENTION

First Embodiment

An explanation of a music data transmission system will be made with reference to figures in the case of an embodiment of the following invention where a transmission standard of the IEC 60958 and the IEC 61937 are used as an example. As to the details of a transmission standard of the IEC 60958 and the IEC 61937, refer to an Interface for non-linear PCM encoded audio bit streams applying IEC 61937 or the like.

Figure 1:
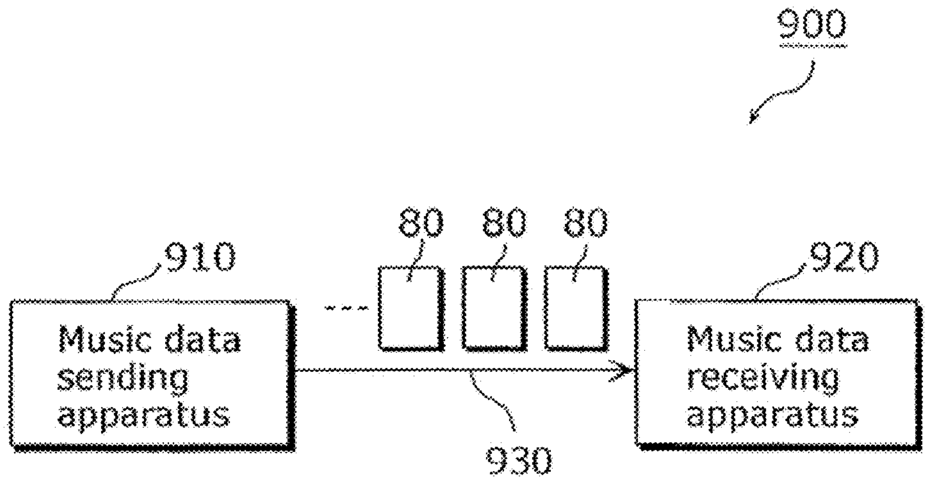
FIG. 1 is a diagram showing an example of connecting a conventional apparatuses in the case of transmitting data.
Figures 2A, 2B, 2C, 2D:
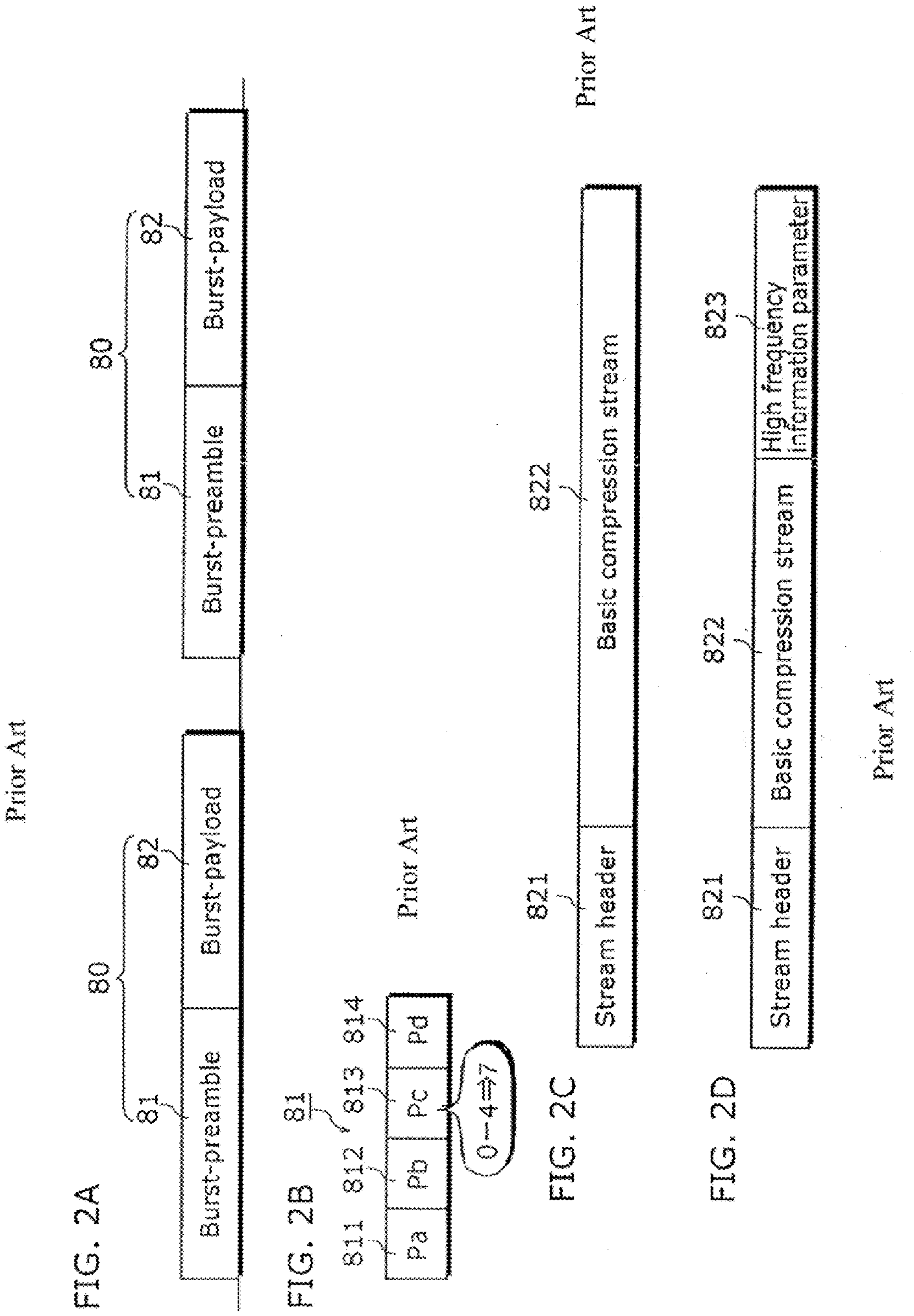
FIG. 2A Prior Art
Prior Art FIG. 2C
Prior Art FIG. 2D
FIG. 2A is a diagram showing a format structure of the data burst 80 to be transmitted from the music data sending apparatus 910 shown in FIG. 1.
FIG. 2B is a diagram showing the format structure of the burst preamble 81.
FIG. 2C is a diagram showing the bit stream structure of the MPEG2 AAC stored in the burst payload 82.
FIG. 2D is a diagram showing the bit stream structure of the MPEG2 AAC SBR stored in the burst payload 82.
Figure 5:
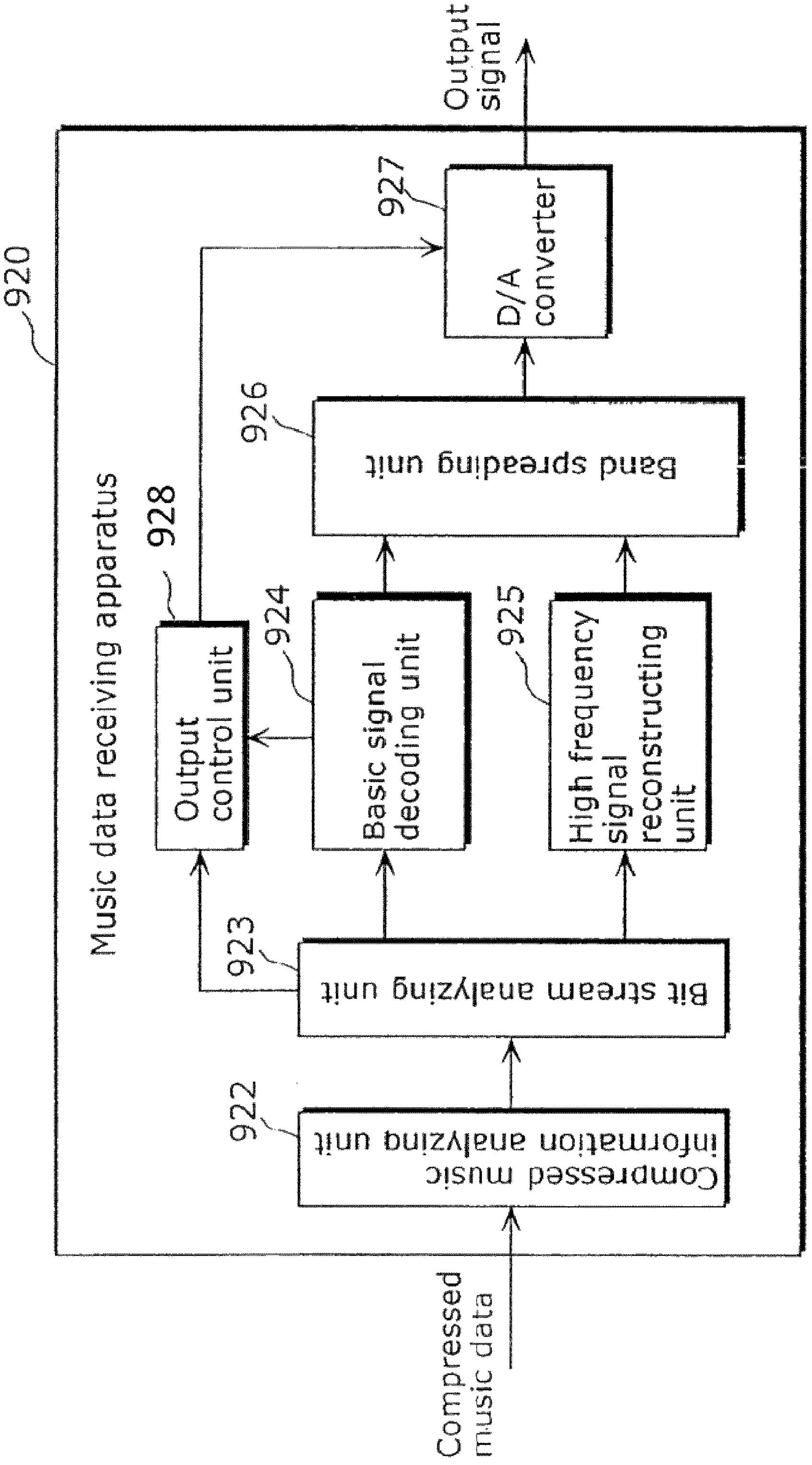
FIG. 5 is a structural diagram of the conventional music data receiving apparatus.
Figure 6:
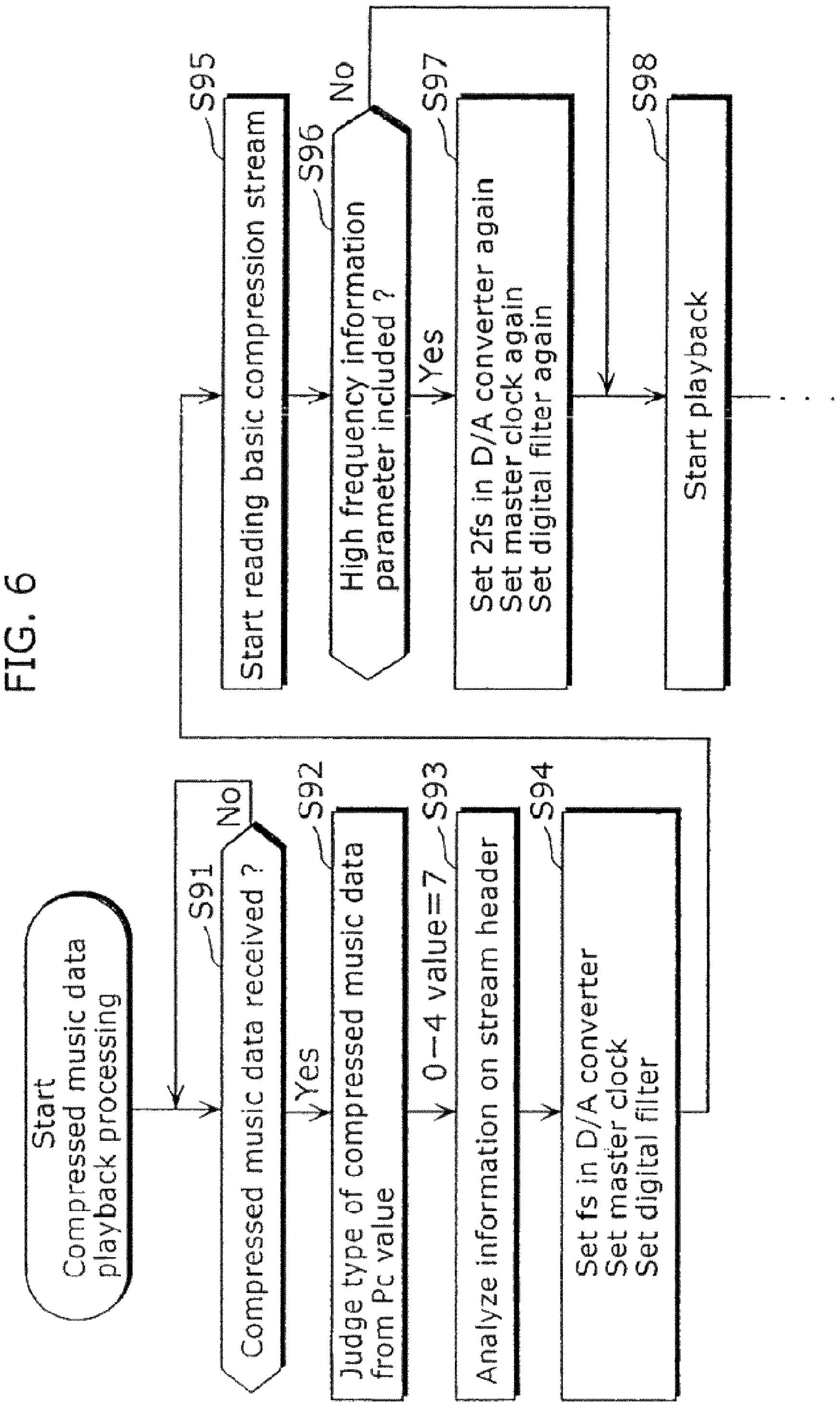
FIG. 6 is a flow chart showing the operation of compressed music data playback processing performed in the music data receiving apparatus 920.
Figure 7:
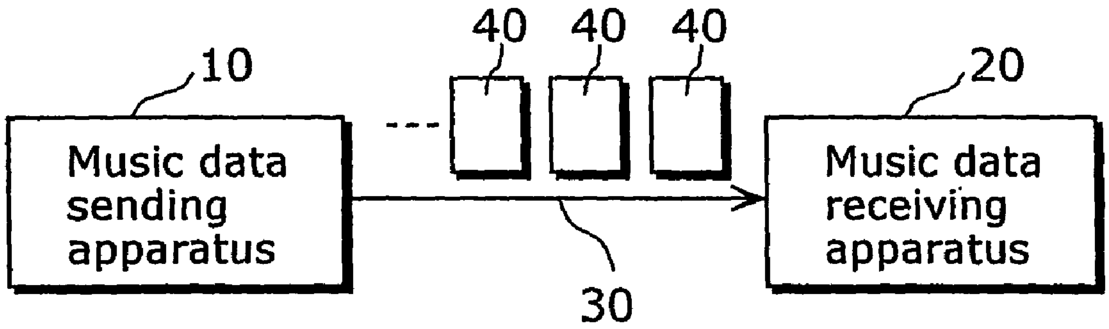
FIG. 7 is a diagram showing an example of connecting consumer digital audio apparatuses that are used in this present invention.

FIG. 7 is a diagram showing an example of connecting consumer digital audio apparatuses used for the present invention.

The music data transmission system 1 comprises a music data sending apparatus 10, a music data receiving apparatus 20 and a transmission path 30 for connecting these apparatuses.

A DVD player, a set top box or the like can be used as the music data sending apparatus 10.

Also, an AV amplifier or the like can be used as the music data receiving apparatus 20.

An optical transmission path or the like can be used as the transmission path 30.

Figure 8:
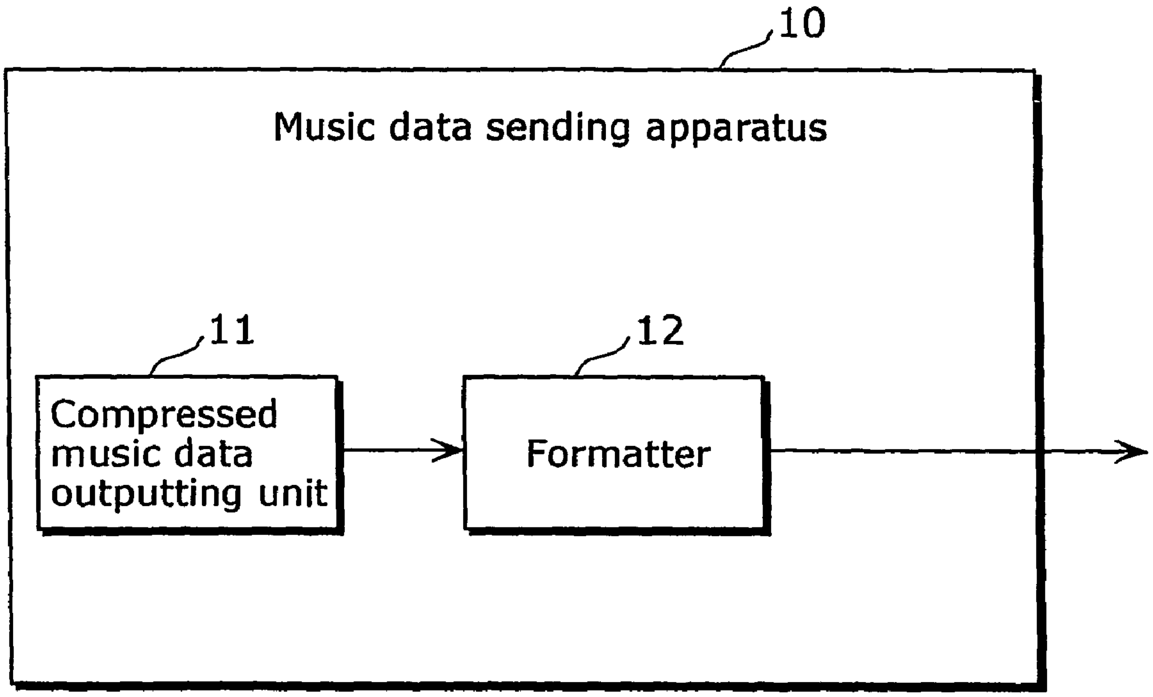
FIG. 8 is a block diagram showing the functional structure of the music data sending apparatus 10.

FIG. 8 is a block diagram showing the functional structure of the music data sending apparatus 10.

The music data sending apparatus 10 comprises a compressed music data outputting unit 11 and a formatter 12.

The compressed music data outputting unit 11 makes non-linear compressed music data from the received linear PCM music data, outputs the made compressed data and outputs the received non-linear compressed music data.

The formatter 12 makes a transmission format of the IEC 61937 in the case where the compressed music data is the MPEG2 AAC or the MPEG2 AAC SBR.

Figure 9:
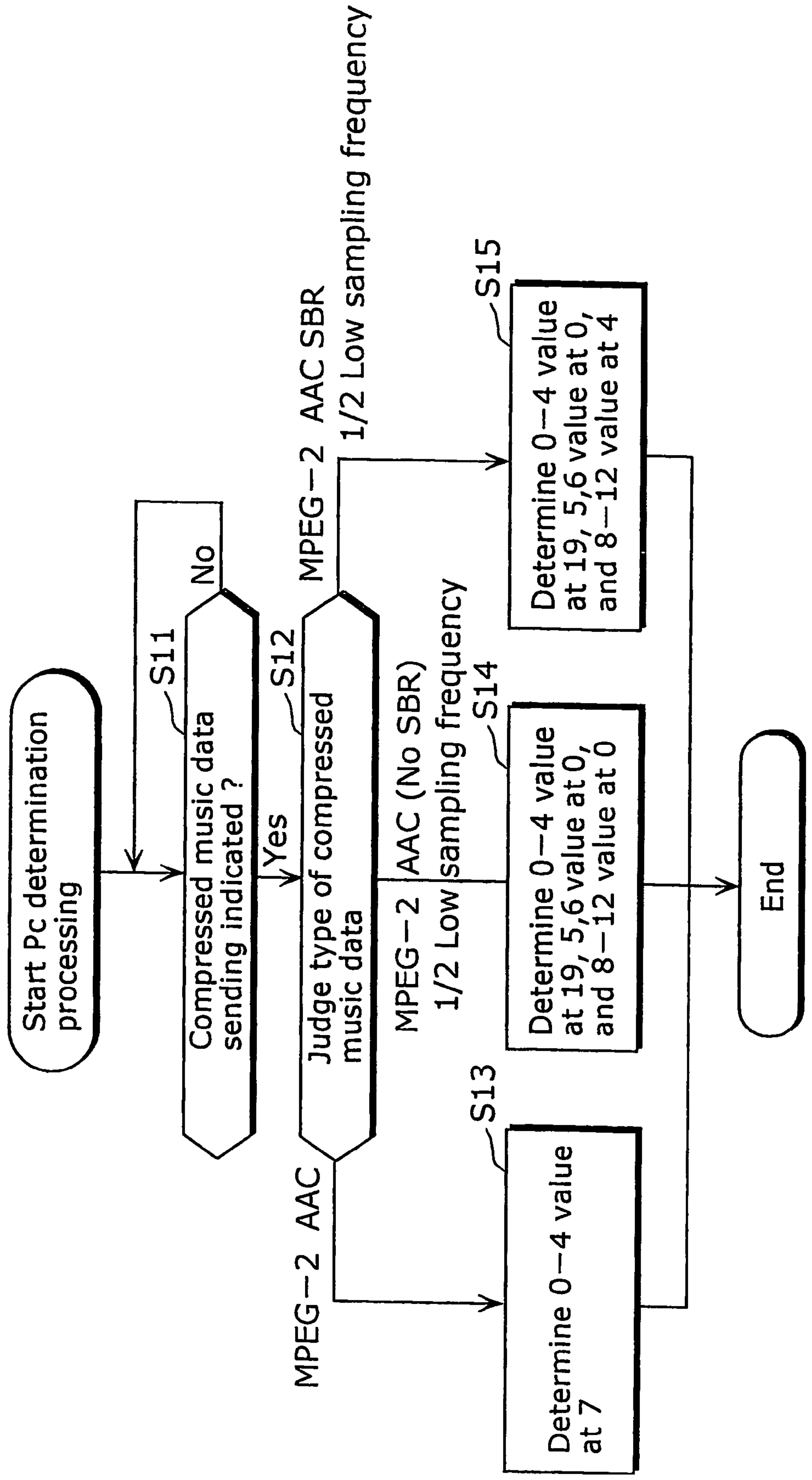
FIG. 9 is a flow chart showing the operation of the Pc determination processing performed by the formatter 12 at the time of making a transmission format of the IEC 61937.

FIG. 9 is a flow chart showing the operation of processing for determining the value to be set at the Pc performed by the formatter 12 at the time of making the transmission format of the IEC 61937.

The formatter 12 waits until the sending indication of the compressed music data comes from a user (S11). In the case where a sending indication of the compressed music data is included (Yes in S11), the formatter 12 judges the type of the compressed music data (S12). This judgment is made by a notification of the type of the compressed music data from the compressed music data outputting unit 11.

As a result of the judgment, in the case where the type of the compressed music data is the MPEG2 AAC, the value of the bit 0-4 is determined as 7 (S13) and Pc determination processing is finished. On the other hand, as a result of judgment, in the case where the type of the compressed music data is the MPEG2 AAC Low sampling frequency, the value of the bit 0-4 is set at 19, bit 5-6 is judged as half rate or quarter rate, 0 is set in the case where it is half rate or 1 is set in the case where it is quarter rate. Further, whether it is SBR or not is judged, and then the value of bit 8-12 is determined as 0 respectively in the case where it is not SBR (S14), the value of bit 8-12 is determined as 4 respectively in the case where it is SBR (S15), and then the Pc determination processing is finished.

In this way, only the music data receiving apparatus 20 analyzing the value of Pc makes it possible to know instantly whether or not a high frequency information parameter 423 is included in the burst payload 42.

After the Pc determination processing finishes, the formatter 12 stores compressed music data in the burst payload 42, sets a predetermined value in the Pa to Pd of the burst preamble 41 and outputs the burst stream via the transmission path 30.

Figures 10A, 10B, 10C, 10D:
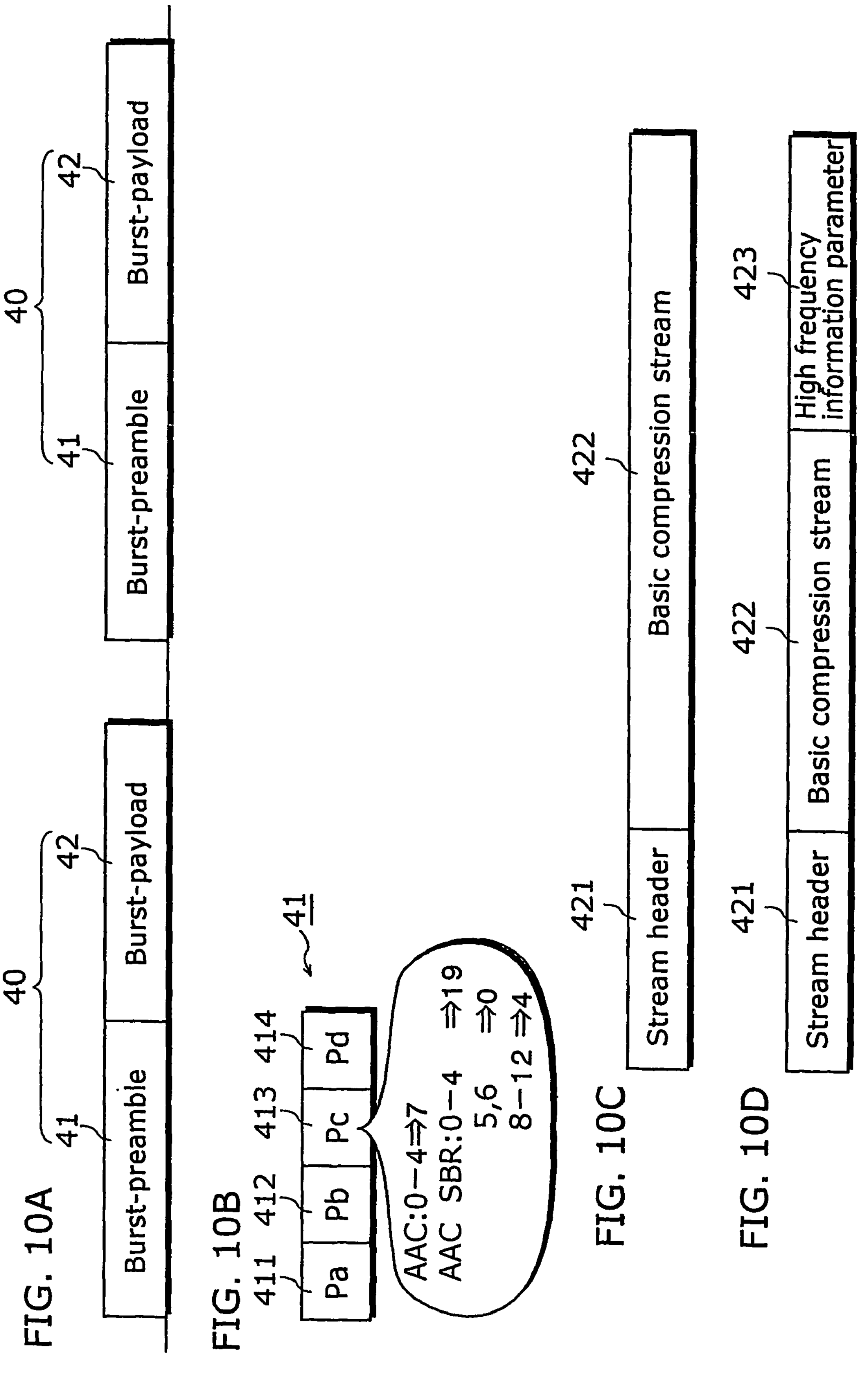
FIG. 10A is a diagram showing the format structure of the data burst 40 in the case of transmitting the MPEG2 AAC using the IEC 61937 from the music data transmission apparatus 10.
FIG. 10B is a diagram showing the format structure of the burst preamble 41.
FIG. 10C is a diagram showing the bit stream structure of the MPEG2 AAC stored in the burst payload 42.
FIG. 10D is a diagram showing the bit stream structure of the MPEG2 AAC stored in the burst payload 82.

FIG. 10A is a diagram showing the format structure of the data burst 40 in the case where the MPEG2 AAC is transmitted from the music data sending apparatus 10 using the IEC 61937.

As shown in FIG. 10A, each data burst 40 comprises a burst preamble 41 indicating the synchronization information or the information of transmission music data and a burst payload 42 where a bit stream of the MPEG2 AAC is stored as shown in FIGS. 10C and 10D.

FIG. 10B is a diagram showing the format structure of the burst preamble 41.

The burst preamble 41 comprises Pa411 and Pb412 indicating a field of the synchronization word, Pc413 indicating a field for providing the type of data and information (burst information) for a receiver, and Pd414 indicating a field for providing a length of the burst payload.

A 16 bit Pc413 is structured, in the transmission in the case of MPEG2 AAC, 7 is set at bit 0-4 indicating the data type, but, for example, in the transmission in the case of MPEG2 AAC SBR 1/2 Low sampling frequency, unlike the conventional way, 19 is set at bit 0-4 indicating the data type, 0 is set at bit 5-6, and 4 is set at bit 8-12 indicating detailed description of data.

FIG. 11 shows a setting example which is performed in Pc (bit 0-15) of the burst preamble 41 of the MPEG2 AAC Low sampling frequency.

As shown in FIG. 11, as to bit 0-4 of Pc813, the value 0 to 6 and 8 to 18 means "in accordance with IEC 61937", the value 7 means "MPEG2 AAC ADTS", the value 19 means "MPEG2 AAC ADTS Low sampling frequency", and the value 20 to 31 means "in accordance with IEC 61937".

Also, in the case where bit 0-4 is MPEG2 AAC Low sampling frequency, as to bit 5-6, the value 0 means "Sub Data type MPEG2 AAC 1/2 Low sampling frequency", the value 1 means "Sub Data type MPEG2 AAC 1/4 Low sampling frequency", the value 2 to 3 means "Reserved". Also, bit 7-15 means "in accordance with IEC 61937".

FIG. 12 is a diagram showing a functional example of the burst preamble Pc (bit 8-12) of the MPEG2 AAC Low sampling frequency.

As to bit 8-12 of Pc, the value 0 means "No indication", the value 1 means "LC profile" (low calculation amount file), the value 2 to 3 means "Reserved for Future profile", the value 4 means "LC profile with SBR", the value 5 to 31 means "Reserved".

In other words, in the burst information concerning the present invention, the MPEG2 AAC is distinguished from the MPEG2 AAC SBR, setting value 4 in the bit 8-12 means MPEG2 AAC SBR, setting another value means MPEG2 AAC. Also, setting value 19 for bit 0-4 enables indicating that value 4 in the bit 8-12 is effective, and setting the value 0 in the bit 5-6 further indicates that it is half sampling. Also, setting value 1 in the bit 5-6 indicates that it is quarter sampling. Here, setting the value 19 in the bit 0-4 means that value 4 in the bit 8-12 is effective, another value such as value 4 of bit 8-12 may be effective even in the case of another data type such as the MPEG4 AAC or the MPEG1 and 2 Layers 3*s*.

FIG. 10C is a diagram showing the bit stream structure of the MPEG2 AAC stored in the burst payload 42.

As shown in FIG. 10C, like a conventional way, the bit stream of the MPEG2 AAC stored in the burst payload 42 comprises a stream header 421 and a basic compression stream 422 of the compressed music data.

FIG. 10D is a diagram showing the bit stream structure of the MPEG2 AAC SBR stored in the burst payload 42.

As shown in FIG. 10D, like a conventional way, the bit stream of the MPEG2 AAC SBR comprises a stream header 421, a basic compression stream 422 and further, a high frequency information parameter 423.

Next, the structure of the music data receiving apparatus 20 shown in FIG. 7 will be explained.

Figure 13:
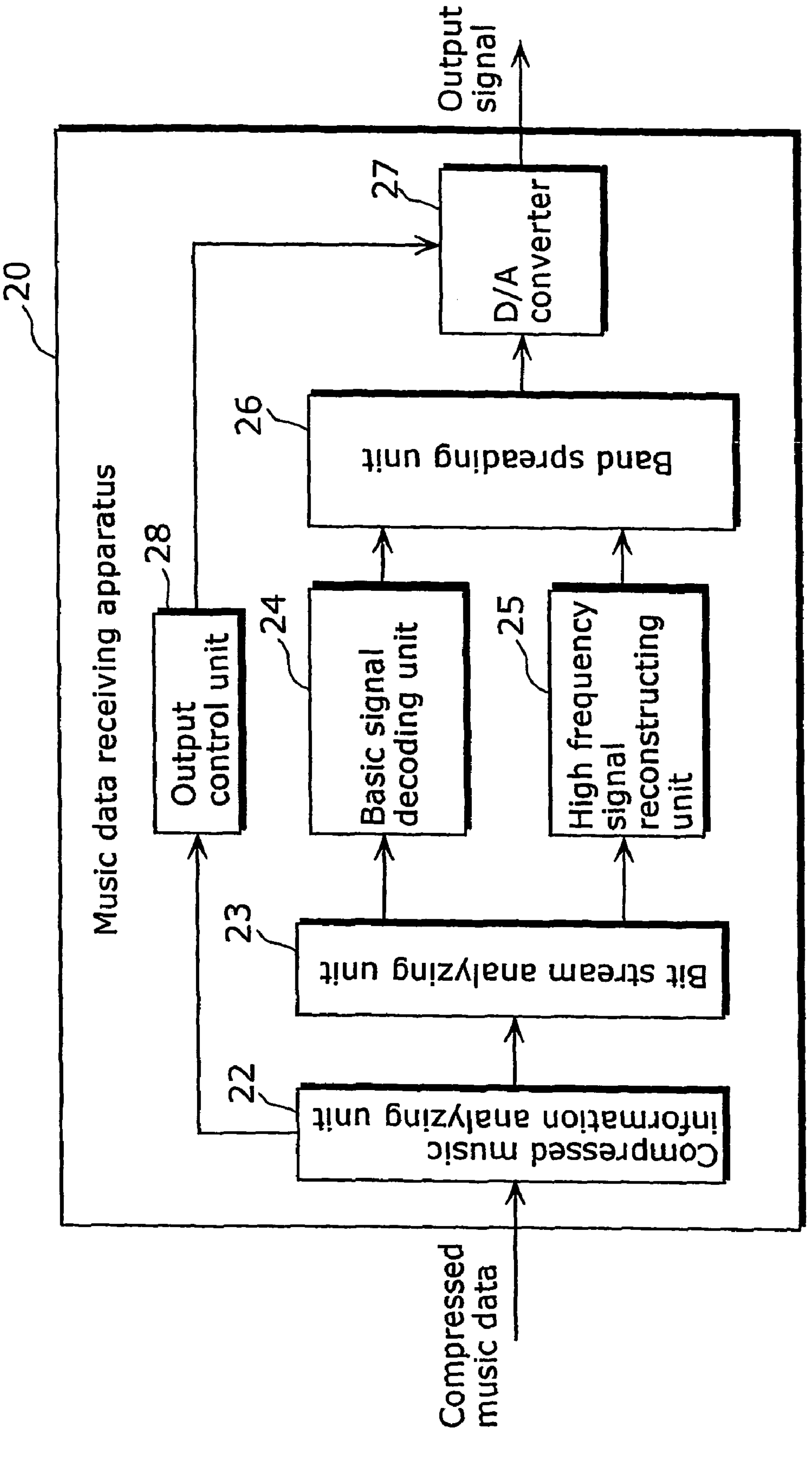
FIG. 13 is a block diagram showing the functional structure of the music data receiving apparatus 20.

FIG. 13 is a block diagram showing the functional structure of the music data receiving apparatus 20.

The music data receiving apparatus 20 comprises a compressed music information analyzing unit 22, a bit stream analyzing unit 23, a basic signal decoding unit 24, a high frequency reconstructing unit 25, a band spreading unit 26, a D/A converter 27 and an output control unit 28.

The compressed music information analyzing unit 22 analyzes a transmission clock and a compressed music data that are analyzed via the transmission path 30. In other words, the compressed music information analyzing unit 22 obtains the sampling frequency fs of the basic music data based on the transmission clock and analyzes whether or not the value showing a mode of the compressed music data, that is, high frequency information is included.

The bit stream analyzing unit 23 analyzes the stream header information.

The basic signal decoding unit 24 decodes the basic part of the bit stream.

The high frequency reconstructing unit 25 reconstructs the high frequency signal based on the high frequency information parameter.

The band spreading unit 26 synthesizes the basic signal with the high frequency signal and converts it into the time area signal.

The D/A converter 27 converts the digital signal into an analog signal.

The output control unit 28 sets parameters such as a sampling frequency, digital filter coefficient and the like in the D/A converter 927 or the like.

Next, the operation of the compressed music data playback processing will be explained.

Figure 14:
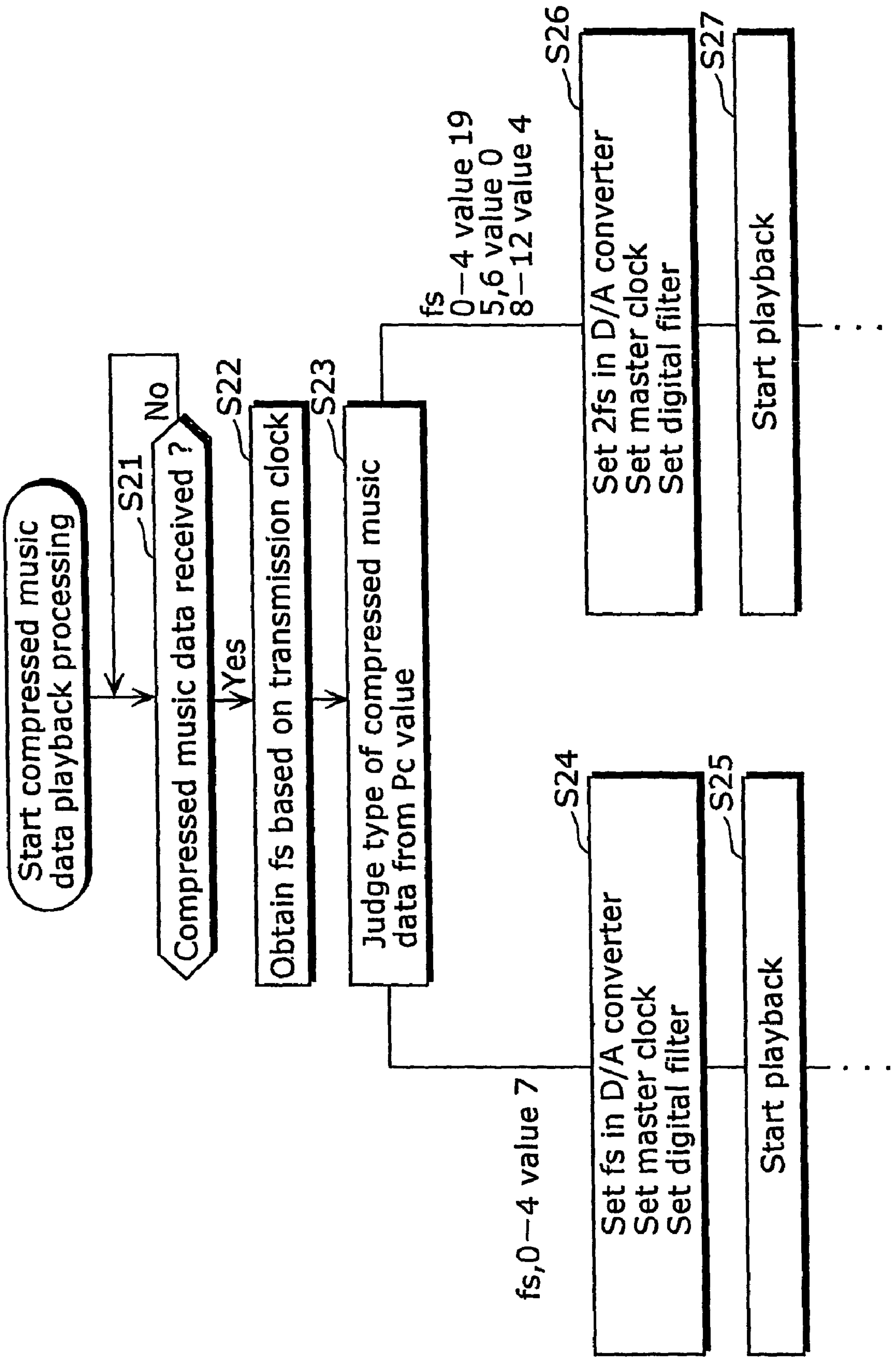
FIG. 14 is a flow chart showing the operation of the compressed music data playback processing.

FIG. 14 is a flow chart showing the operation of the compressed music data playback processing.

The compressed music information analyzing unit 22 of the music data receiving apparatus 20 waits for receiving the compressed music data (S21). On receiving the compressed music data (Yes in S21), the compressed music information analyzing unit 22 analyzes the transmission clock first and obtains sampling frequency fs corresponding to the transmission clock based on the transmission clock (S22). On receiving the sampling frequency fs, the compressed music information analyzing unit 22 reads the information of the audio data stored in the burst preamble Pc of the IEC 61937, and analyzes the type of the compressed music data from the Pc value (S23). Normally, the type of the compressed music data is stored in the bit 0-4 of the Pc, the attribution information is stored in the bit 5-6, a flag showing an error is stored in the bit 7, characteristic information of the compressed music data is stored in bit 8-12 respectively.

Provided that the value of the bit 0-4 is 19, that is, the data-type is the MPEG2 AAC Low sampling frequency, in the case of reading the bit 5-6 next and finding that the value is set at 0, the case indicates that it is half sampling and that the repeat cycle of the burst preamble is 2048. Next, it is possible to judge whether or not high frequency information parameters are included in the profile of the MPEG2 AAC Low sampling frequency or the compressed audio data, that is, whether or not it is 4 by reading bit 8-12.

Based on the analysis of presence or absence of high frequency information like this, the compressed music information analyzing unit 22 sends this sampling frequency fs and the analysis result obtained by the judgment in step S22, that is, the result of presence or absence of the high frequency information parameter. In other words, the value 7 of bit 0-4 indicating "no high frequency information" is sent in the case of the MPEG2 AAC, the value 19 of bit 0-4 indicating low sampling, the value 0 of bit 5-6 and the value 4 of bit 8-12 indicating "high frequency information included" are sent in the case of the MPEG2 AAC SBR 1/2 Low sampling frequency.

In the case where no high frequency information parameter is included, for example, in the case of a normal MPEG2 AAC or the like, the output control unit 28 sets sampling frequency corresponding to the clock of the received IEC 61937 or sampling frequency stored in the header of the basic compression stream (S24). In the case where no high frequency information parameter is included, the basic compression stream analyzed in the bit stream analyzing unit 23 is decoded in the basic signal decoding unit 24. In the D/A converter 27, as it has already been set in the sampling frequency fs, it is converted from digital signal into analog signal as it is and playback is started at timing earlier than conventional (S25).

In other words, in the case where no high frequency information parameter is included, in the output control unit 28, the same sampling frequency as the sampling frequency stored in the stream header 421 is set in the D/A converter 27. In the basic signal decoding unit 24, the basic compression stream 422 is decoded. In the high frequency signal reconstructing unit 25, no particular processing is performed because no high frequency information is included. Also, in the band spreading unit 26, only a signal from the basic signal decoding unit 24 is used, no particular band spreading processing is performed, and it is converted into a signal of the time part as it is. The signal from the band spreading unit 26 is outputted to the D/A converter 27 and the signal with a band component processed in the basic signal decoding unit 24 will be outputted.

On the other hand, in the case where high frequency information parameter is included, the output control unit 28 doubles the setting of the sampling frequency fs obtained based on the transmission clock (S26). The set sampling frequency may be displayed on the display unit of the music data receiving apparatus 20. In the case where high frequency information is included, the basic compression stream analyzed by the bit stream analyzing unit 23 is decoded in the basic signal decoding unit 24. On the other hand, in the high frequency reconstructing unit 25, high frequency signal is reconstructed based on the high frequency signal information parameter.

Next, a basic signal and a high frequency signal are synthesized in the band spreading unit 26 and converted into time part signals and outputted to the D/A converter 27 as signals of the sampling frequency which is twice the number of the sampling frequency obtained based on the transmission clock. In the D/A converter 27, it has been already set to the sampling frequency that is twice, the digital signal is converted into an analog signal as it is, and it is outputted as a signal that includes up to a high frequency component, which enables starting high quality playback faster than conventional (S27).

As explained up to this point, setting a value indicating the presence of a high frequency information parameter in the Pc of the burst preamble on the IEC 61937 makes it possible to judge the presence or absence of the high frequency information quickly at the receiving side and playing back the signals that include up to high frequency.

Second Embodiment

Next, another structure of the music data receiving apparatus concerning the present invention will be explained.

Figure 15:
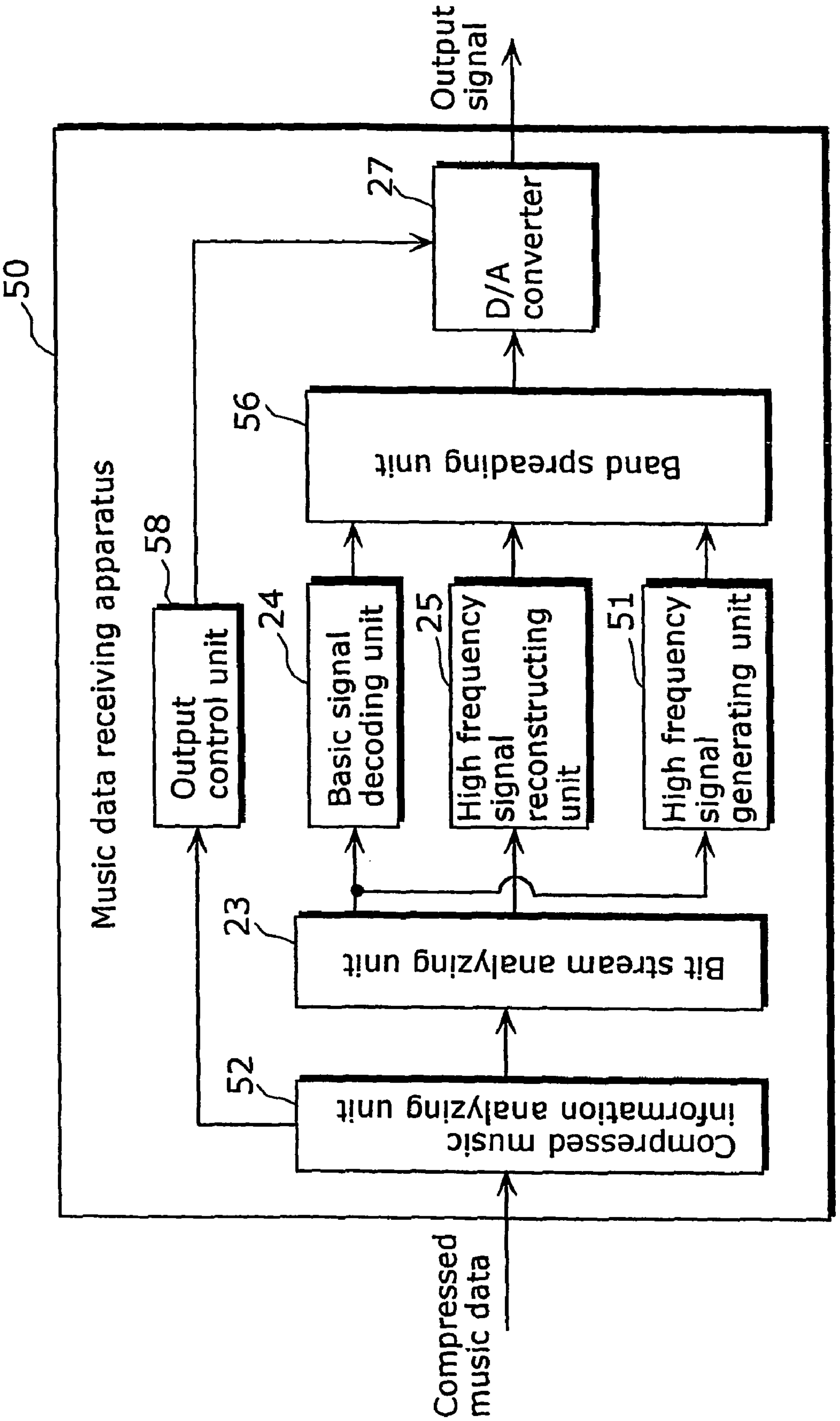
FIG. 15 is a block diagram showing the functional structure of another music data receiving apparatus concerning the second embodiment of the present invention.

FIG. 15 is a block diagram showing the functional structure of another music data receiving apparatus concerning the second embodiment of the present invention.

By the way, in the music data receiving apparatus 20 concerning the first embodiment, in the case where the music data is the first mode, that is, the MPEG2 AAC, this embodiment differs from the first embodiment in that band spreading is not performed, but this music data receiving apparatus 50 is structured in a way that it has a high frequency signal generating unit 51 operable to generate high frequency information from the basic music data of the MPEG2 AAC.

Compressed music data to be inputted is analyzed in the compressed music information analyzing unit 52 of this music data receiving apparatus 50, but in the case where no high frequency parameter is included, the high frequency signal generating unit 51 predicts higher frequency components and automatically generates high frequency signals based on the signals decoded in the basic signal decoding unit 24. Also, information for setting the frequency which is twice the number of the sampling frequency fs is sent to the output control unit 58 at the same time. In this case, no particular processing is performed in the high frequency signal reconstructing unit 25.

The band spreading unit 56 synthesizes the signal from the basic signal decoding unit 24 with the signal from the high frequency signal generating unit 51 and outputs the sampling frequency signal which is twice the number of the sampling frequency obtained from the transmission clock.

As explained up to this point, even in the case where no high frequency information parameter is included, predicting high frequency components from the signals decoded in the basic signal decoding unit 24 makes it possible to play back signals wider than the signal components stored in the original bit stream signals.

Note that the frequency band of the basic music data is not limited to 10 kHz or less. In this case, the band is extended to 20 kHz or more, and it becomes possible to realize high quality playback by approaching the band whose status is similar to the natural status even though it is not audible for human beings.

Note that the sampling frequency to be set in the D/A converter is doubled according to the presence or absence of the high frequency information parameter in the first and second embodiments, but it may be the sampling frequency which is four times higher than the original one or arbitrary number of sampling frequency.

Also, the present invention can be applied for not only the IEC 61937 standard or the IEC 60958 standard that has been explained as an example but also in the case where it is used in the IEC 61937 conformant such as the IEEE 1394 that is a future audio video data transmission standard or High Definition Multimedia Interface (HDMI) or the like Also, in the first and second embodiments, the MPEG2 AAC has been focused in the explanation, but it is possible to transmit and process the data in a similar format even in the case of another codec such as the MPEG4 AAC.

Further, in the first and second embodiment, the sampling frequency is obtained based on the transmission clock in the first and the second embodiment, but it is also possible to notify the compressed music information analyzing unit 22 of the sampling frequency included in the stream header analyzed by the bit stream analyzing unit 23. In this way, it is possible to start playing back faster than conventional.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

It is applicable for the transmission system for connecting a music data sending apparatus such as a DVD player for outputting compression multi channel voice, a set top box and the like, and a music data receiving apparatus such as an AV amplifier for decoding and playing back data via a transmission path such as an optical transmission path.

The invention claimed is:

1. A receiving apparatus that receives compressed music data first and then music information concerning the compressed music data, in a transmission order of the music information first and the compressed music data next, wherein the compressed music data is one of (i) compressed music data including compressed basic music data made in a first mode and (ii) compressed music data including the basic music data and high frequency information made in a second mode, the high frequency information being used to extend high frequency of the basic music data, and the music information includes a value indicating the mode used to make the compressed music data, the receiving apparatus comprising:

- a compressed music data analyzing unit configured to analyze the value indicating the mode used to make the compressed music data, receive the music information and the compressed music data using a transmission clock corresponding to a sampling frequency of the basic music data, and obtain the sampling frequency based on the received transmission clock;
- a D/A converter configured to convert a signal from digital to analog based on the compressed music data;

an output control unit configured to previously set a sampling frequency of a predetermined magnification in the D/A converter, based on the sampling frequency notified by the compressed music data analyzing unit and the mode of the compressed music data;

a basic signal decoding unit configured to decode the basic music data;

a high frequency signal reconstructing unit configured to reconstruct the high frequency signal based on the high frequency information in the case of the second mode; and a band spreading unit configured to output a signal decoded by the basic signal decoding unit in the case of the first mode, and output a signal obtained by synthesizing the signal decoded by the basic signal decoding unit with the high frequency signal reconstructed by the high frequency signal reconstructing unit in the case of the second mode, wherein the D/A converter converts the signal from digital to analog, the signal being outputted by the band spreading unit using the previously set sampling frequency, and the receiving apparatus further comprising a high frequency signal generating unit configured to generate a high frequency signal based on the basic music data, and wherein the output control unit is configured to cause the band spreading unit to (i) synthesize the signal decoded by the basic signal decoding unit in the case of the first mode with the high frequency signal generated by the high frequency signal generating unit and (ii) output the synthesized signal, and configured to control the operation of the D/A converter.

2. A transmission system of compressed music data comprising a sending apparatus and a receiving apparatus that are connected to each other through a transmission path, wherein the sending apparatus comprises:

a compressed music data outputting unit configured to output one of (i) compressed music data including basic music data made in a first mode and (ii) compressed music data including the basic music data and high frequency information made in a second mode, the high frequency information being used to extend high frequency of the basic music data; and a formatter configured to transmit the compressed music data outputted by the compressed music data outputting unit and music information including a value indicating the mode of the compressed music data, in a transmission order of the music information first and the compressed music data next, and wherein the receiving apparatus comprises:

a compressed music data analyzing unit configured to analyze the value indicating the mode used to make the compressed music data, receiving the music information and the compressed music data using a transmission clock corresponding to a sampling frequency of the basic music data, and obtain the sampling frequency based on the received transmission clock;

a D/A converter configured to convert a signal from digital to analog based on the compressed music data;

an output control unit configured to previously set a sampling frequency of a predetermined magnification in the D/A converter, based on the sampling frequency notified by the compressed music data analyzing unit and the mode of the compressed music data;

a basic signal decoding unit configured to decode the basic music data;

a high frequency signal reconstructing unit configured to reconstruct the high frequency signal based on the high frequency information in the case of the second mode; and a band spreading unit configured to output a signal decoded by the basic signal decoding unit in the case of the first mode, and output a signal obtained by synthesizing the signal decoded by the basic signal decoding unit with the high frequency signal reconstructed by the high frequency signal reconstructing unit in the case of the second mode, wherein the D/A converter converts the signal from digital to analog, the signal being outputted by the band spreading unit using the previously set sampling frequency, and the receiving apparatus further comprising a high frequency signal generating unit configured to generate a high frequency signal based on the basic music data, and wherein the output control unit is configured to cause the band spreading unit to (i) synthesize the signal decoded by the basic signal decoding unit in the case of the first mode with the high frequency signal generated by the high frequency signal generating unit and (ii) output the synthesized signal, and configured to control the operation of the D/A converter.

3. A receiving method of receiving compressed music data first and then music information concerning the compressed music data, in a transmission order of the music information first and the compressed music data next, wherein the compressed music data is one of (i) compressed music data including compressed basic music data made in a first mode and (ii) compressed music data including the basic music data and high frequency information made in a second mode, the high frequency information being used to extend high frequency of the basic music data, and the music information includes a value indicating the mode used to make the compressed music data, the receiving method comprising:

a compressed music data analyzing step of analyzing the value indicating the mode used to make the compressed music data, receiving the music information and the compressed music data using a transmission clock corresponding to a sampling frequency of the basic music data, and obtaining the sampling frequency based on the received transmission clock;

a D/A converting step of converting a signal from digital to analog based on the compressed music data;

an output control step of previously setting a sampling frequency of a predetermined magnification in the D/A converter, based on the sampling frequency obtained in the compressed music data analyzing step and the mode of the compressed music data;

a basic signal decoding step of decoding the basic music data;

a high frequency signal reconstructing step of reconstructing the high frequency signal based on the high frequency information in the case of the second mode; and a band spreading step of outputting a signal decoded in the basic signal decoding step in the case of the first mode, and outputting a signal obtained by synthesizing the signal decoded in the basic signal decoding step with the high frequency signal reconstructed in the high frequency signal reconstructing step in the case of the second mode, wherein, in the D/A converting step, the signal outputted in the band spreading step is converted from digital to analog using the previously set sampling frequency, the receiving method further comprising a high frequency signal generating step of generating a high frequency signal based on the basic music data, wherein the output control step includes controlling the band spreading step such that (i) the signal decoded in the basic signal decoding step in the case of the first mode is synthesized with the high frequency signal generated in the high frequency signal generating step and (ii) the synthesized signal is outputted, and includes controlling the operation of the D/A converter.

4. A method of transmitting and receiving compressed music data in a system including a sending apparatus and a receiving apparatus that are connected to each other through a transmission path, the method comprising:

a compressed music data outputting step of outputting, in the sending apparatus, one of (i) compressed music data including basic music data made in a first mode and (ii) compressed music data including the basic music data and the high frequency information made in a second mode, the high frequency information being used to extend high frequency of the basic music data;

a formatting step of transmitting, in the second apparatus, the compressed music data outputted in the compressed music data outputting step and music information including a value indicated the mode of the compressed music data, in a transmission order of the music information first and the compressed music data next; and a compressed music data analyzing step of analyzing, in the receiving apparatus, a transmission clock and the value indicating the mode of the compressed music data, receiving the music information and the compressed music data using a transmission clock corresponding to a sampling frequency of the basic music data, and obtaining the sampling frequency based on the received transmission clock;

a D/A converting step of converting, in the receiving apparatus, a signal from digital to analog based on the compressed music data;

an output control step of previously setting, in the receiving apparatus, a sampling frequency of a predetermined magnification in the D/A converter, based on the sampling frequency obtained in the compressed music data analyzing step and the mode of the compressed music data;

a basic signal decoding step of decoding the basic music data, in the receiving apparatus;

a high frequency signal reconstructing step of reconstructing, in the receiving apparatus, the high frequency signal based on the high frequency information in the case of the second mode; and a band spreading step, in the receiving apparatus, of outputting a signal decoded in the basic signal decoding step in the case of the first mode, and outputting a signal obtained by synthesizing the signal decoded in the basic signal decoding step with the high frequency signal reconstructed in the high frequency signal reconstructing step in the case of the second mode, wherein, in the D/A converting step, the signal outputted in the band spreading step is converted from digital to analog using the previously set sampling frequency, the method further comprising a high frequency signal generating step of generating a high frequency signal based on the basic music data, in the receiving apparatus, wherein the output control step includes controlling the band spreading step such that (i) the signal decoded in the basic signal decoding step in the case of the first mode is synthesized with the high frequency signal generated in the high frequency signal generating step and (ii) the synthesized signal is outputted, and includes controlling the operation of the D/A converter.

5. A non-transitory computer-readable recording medium storing a computer program that is executed, when loaded, by a receiving apparatus that receives compressed music data and music information concerning the compressed music data, in a transmission order of the music information first and the compressed music data next, wherein the compressed music data is one (i) compressed music data including compressed basic music data made in a first mode and (ii) compressed music data including the basic music data and high frequency information made in a second mode, the high frequency information being used to extend high frequency of the basic music data, a value indicating the mode of the compressed music data is included in the music information, and wherein the program causes the receiving apparatus to execute the following steps:

a compressed music data analyzing step of analyzing the value indicating the mode of the compressed music data, receiving the music information and the compressed music data using a transmission clock corresponding to a sampling frequency of the basic music data, and obtaining the sampling frequency based on the received transmission clock;

a D/A converting step of converting a signal from digital to analog based on the compressed music data;

an output control step of previously setting a sampling frequency of a predetermined magnification in the D/A converter, based on the sampling frequency obtained in the compressed music data analyzing step and the mode of the compressed music data;

a basic signal decoding step of decoding the basic music data;

a high frequency signal reconstructing step of reconstructing the high frequency signal based on the high frequency information in the case of the second mode; and a band spreading step of outputting a signal decoded in the basic signal decoding step in the case of the first mode, and outputting a signal obtained by synthesizing the signal decoded in the basic signal decoding step with the high frequency signal reconstructed in the high frequency signal reconstructing step in the case of the second mode, wherein, in the D/A converting step, the signal outputted in the band spreading step is converted from digital to analog using the previously set sampling frequency, the program further causing the receiving apparatus to execute a high frequency signal generating step of generating a high frequency signal based on the basic music data, and wherein the output control step includes controlling the band spreading step such that (i) the signal decoded in the basic signal decoding step in the case of the first mode is synthesized with the high frequency signal generated in the high frequency signal generating step and (ii) the synthesized signal is outputted, and includes controlling the operation of the D/A converter.

* * * * *